US 6,680,715 B2

(12) United States Patent
Blotky et al.

(10) Patent No.: US 6,680,715 B2
(45) Date of Patent: *Jan. 20, 2004

(54) ELECTRONIC BASEBALL CARD AND STAND FOR THE SAME

(75) Inventors: Randolph M. Blotky, Los Angeles, CA (US); Gregory B. Thagard, Los Angeles, CA (US); John H. Dargan, Palos Verdes Estates, CA (US)

(73) Assignee: Time Warner Entertainment Co LP, Burbank, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 09/390,242

(22) Filed: Sep. 3, 1999

(65) Prior Publication Data

US 2002/0158810 A1 Oct. 31, 2002

(51) Int. Cl.⁷ .................................................. G09G 5/00
(52) U.S. Cl. ...................... 345/1.3; 345/901; 40/124.01
(58) Field of Search ........................... 345/1.1–1.3, 901, 345/905; 235/375, 380, 487, 495; 463/43, 44; 40/124.05, 124.01, 124.02, 124.07, 124.19, 124.03

(56) References Cited

U.S. PATENT DOCUMENTS

| | | | | |
|---|---|---|---|---|
| 4,159,417 A | * | 6/1979 | Rubincam ..................... 235/375 |
| 4,681,548 A | * | 7/1987 | Lemelson |
| 4,890,229 A | * | 12/1989 | Rudnick |
| 5,493,105 A | * | 2/1996 | Desai ........................... 235/375 |
| 5,743,801 A | * | 4/1998 | Welander ....................... 463/44 |
| 5,748,731 A | * | 5/1998 | Shepherd |
| 5,821,688 A | * | 10/1998 | Shanks et al. |
| 5,841,878 A | * | 11/1998 | Arnold et al. ............ 40/124.03 |
| 6,254,001 B1 | * | 7/2001 | Chan ............................ 235/380 |
| 6,266,069 B1 | * | 7/2001 | Thagard et al. |

* cited by examiner

Primary Examiner—Regina Liang
(74) Attorney, Agent, or Firm—Gottlieb, Rackman & Reisman, P.C.

(57) ABSTRACT

An electronic baseball card and an associated adapter is disclosed for showing images of baseball players or other personalities. The card includes a flat body similar to a standard pre-printed baseball card with an electronic display and a memory storing imaging data. The display shows images based on the data from the memory. The stand includes its own memory and an external interface for receiving data from an external source and for storing it into its memory. When the card is coupled to the stand, the data from the stand memory may be transferred and stored in the card memory. In addition to images, the card and/or the stand can also display other information such as statistical or biographical information of one or more players.

14 Claims, 3 Drawing Sheets

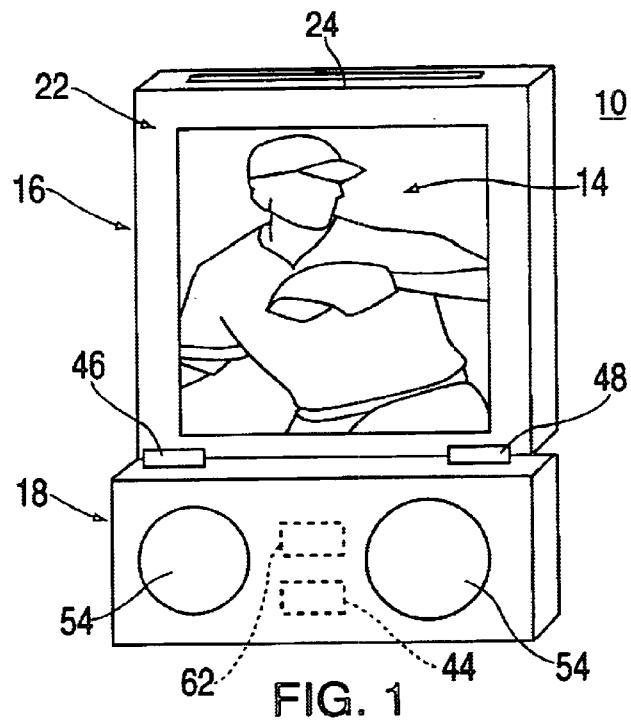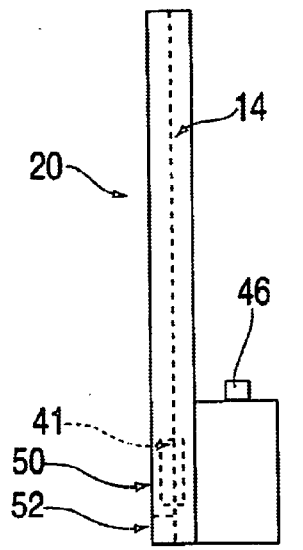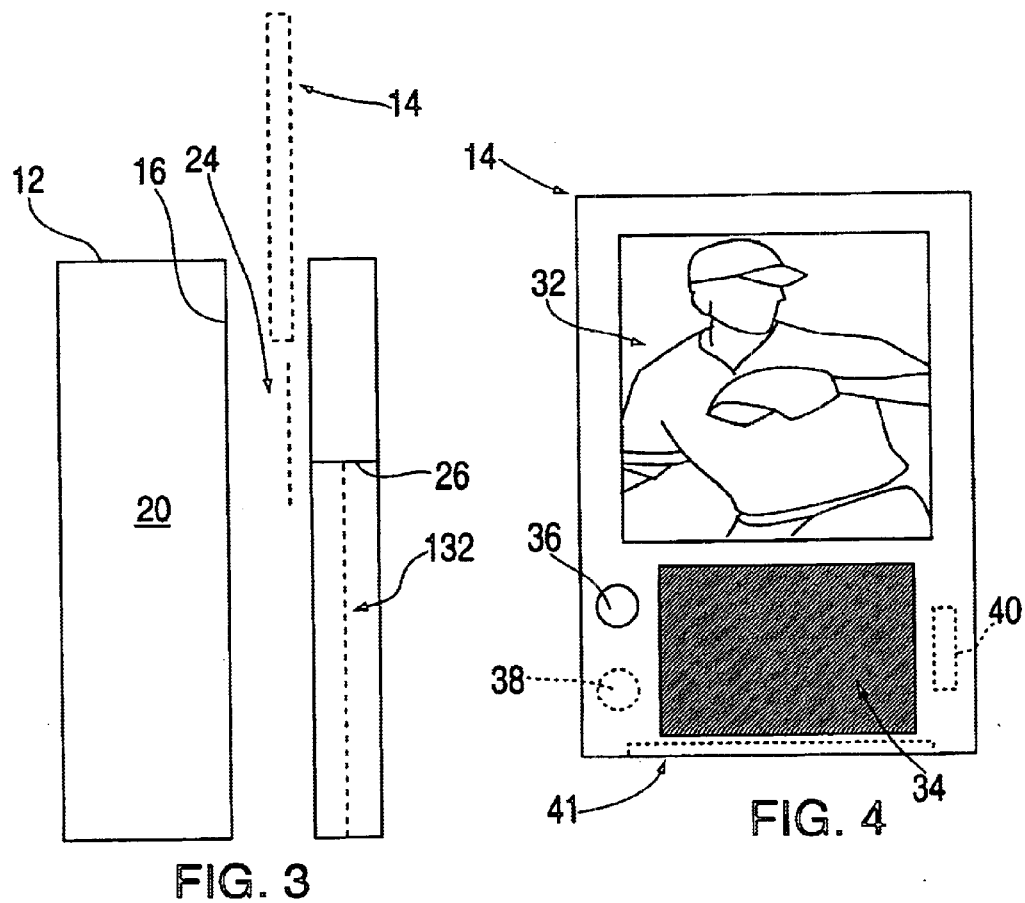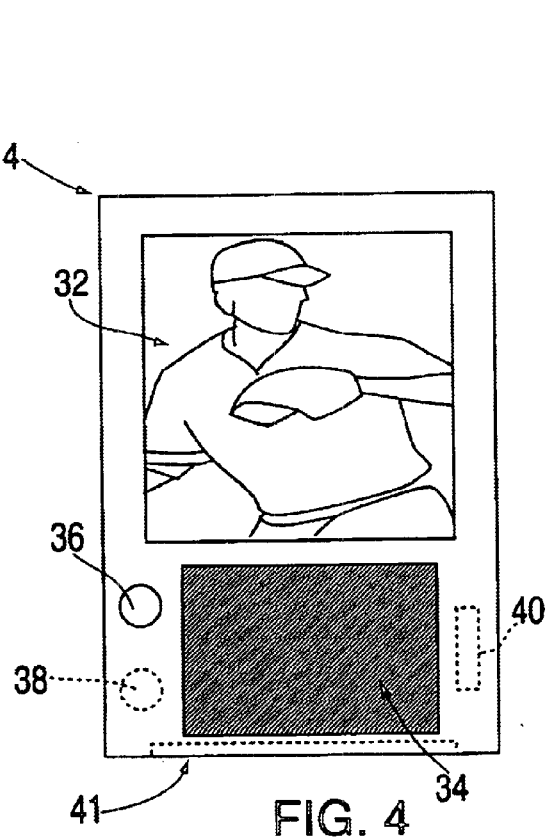

ELECTRONIC BASEBALL CARD AND STAND FOR THE SAME

BACKGROUND OF THE INVENTION a. Field of Invention

This invention pertains to an electronic card adapted to display still or moving images of baseball players or other sports-related personalities or sporting events. The invention further relates to a stand or other structure arranged and constructed to operate in conjunction with said electronic baseball card to update information stored in the baseball card, and/or to perform other functions.

b. Description of the Prior Art

Printed baseball cards have been popular for many years, especially with adolescents. Similar cards have also been available for other sports, including basketball and football, as well as for other entertainment activities such as movies.

These cards usually consist of a rectangular piece of cardboard with a picture of a player on one side and statistical information related to the player, his team, the relevant sport and, so on, on the other side. Of course, the information provided on the card becomes obsolete very fast and there is no practical way to update the information on the card. Moreover, the picture on the printed card is static and usually not very attractive.

OBJECTIVES AND SUMMARY OF THE INVENTION

It is an objective of the present invention to provide an electronic card capable of showing an image stored in a memory on the card.

A further objective is to provide an electronic card with or without a stand which can be used to display static or dynamic images of sports players or any other subjects.

A further objective is to provide an assembly which includes an electronic baseball card and a stand capable of displaying and updating multimedia presentations.

Other objectives and advantages of the invention shall become apparent from the following description.

Briefly, an electronic baseball card constructed in accordance with this invention includes a thin flat body resembling a standard printed baseball card.

Disposed or incorporated into the body is a card memory storing imaging data and a display associated with the memory for showing one or more images. The body is also provided with a zone on which statistics and/or biographical data may be printed for one or more baseball players. In an alternate embodiment, a second display is used to show this information based on data stored in the memory. Power for the display and the memory is provided by a small battery also incorporated in the card. A switch may also be added to selectively activate the display. The card may be used to show a plurality of images, in which case each image is selected using the same or a different switch. The card is provided with an input data port that receives data for storage into the card memory.

A card adapter is also provided which may be used as a coupler to either update the data stored in the memory of the card, or to replace the data altogether with new data associated with a different player, team, etc. The card adapter includes its own memory and an external interface for receiving data from the outside world.

When the card is coupled to the card adapter, data received from the external interface and stored in the adapter memory can be transferred to the card memory. In an advantageous configuration, the card adapter is in the form of a stand with a frame shaped to receive the electronic baseball card. Preferably, the frame is structured so that the image shown in the display of the card can be seen through the frame. The stand may be provided with its own battery, display and other accessories such as one or more speakers. The speakers and the card may cooperate to play a multimedia presentation consisting of images and sounds.

BRIEF DESCRIPTION OF THE DRAWINGS

FIG. 1 shows an orthogonal view of a card assembly including an electronic baseball card and an associated stand constructed in accordance with this invention;

FIG. 2 shows a side elevational view of the assembly of FIG. 1;

FIG. 3 shows an enlarged partial cross-sectional view of the assembly of FIGS. 1 and 2 illustrating the insertion of the card into the stand;

FIG. 4 shows a plan view of the baseball card used in the assembly of FIGS. 1–3;

DETAILED DESCRIPTION OF THE PREFERRED EMBODIMENTS

Figure 5:
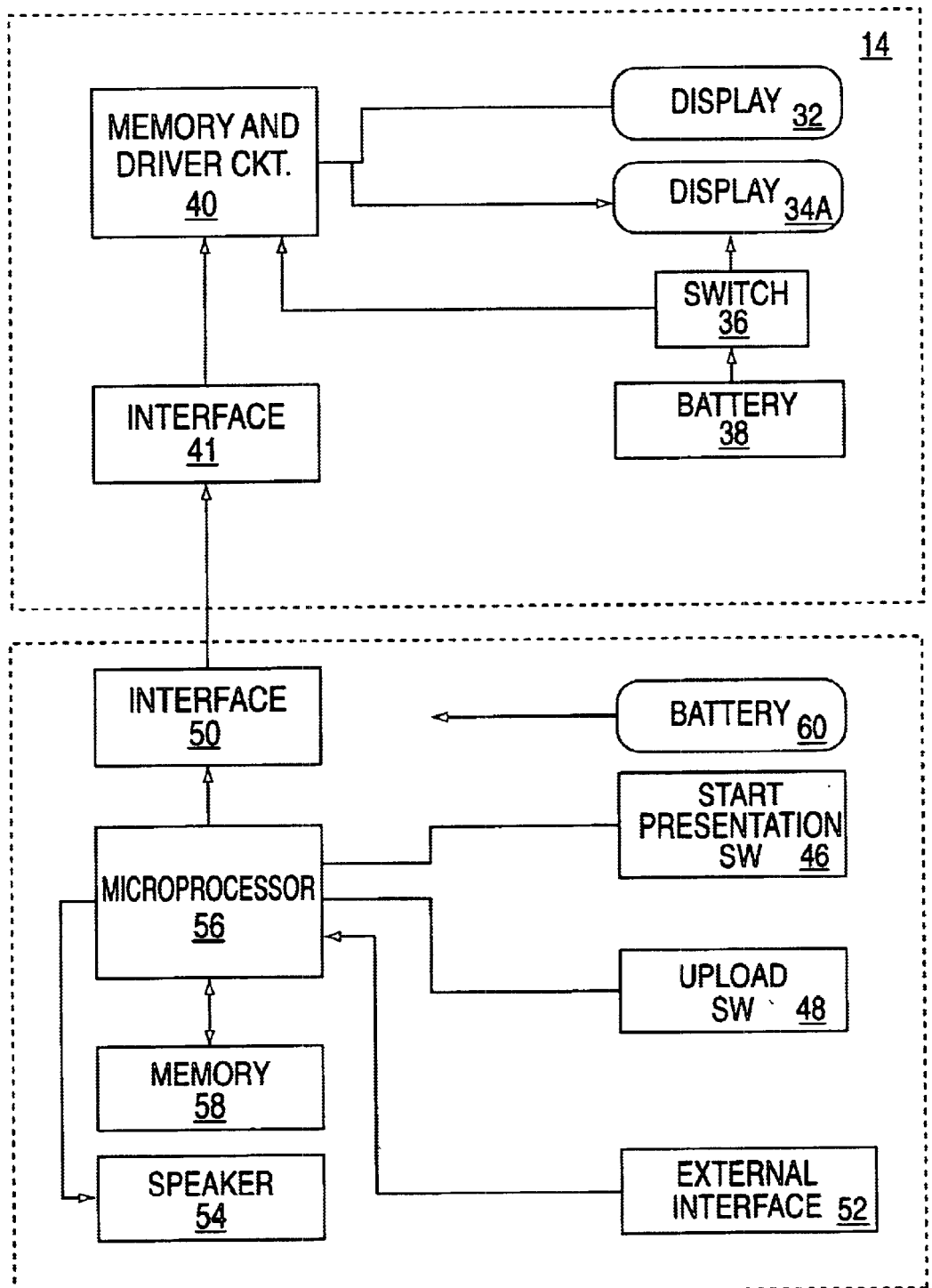
FIG. 5 shows a block diagram of a first embodiment of the baseball card assembly of FIGS. 1–3.

Referring now to FIGS. 1–3, a card assembly 10 constructed in accordance with this invention includes a stand 12 and an electronic baseball card 14. It should be understood that the term baseball card is used herein only to describe one preferred embodiment, it being understood that electronic cards for presenting other images and information may be provided using the same structure and method of operation.

Card 14 shown in detail in FIG. 4 is flat so that it can be carried in a pocket.

As with standard printed baseball cards, card 14 can also be stacked with several other cards similar to card 14 and carried in a pocket so that a person, typically an adolescent, can view the cards and trade them at will. Generally, the card 14 is rectangular and has a top surface 30. An electronic display 32 is mounted or imbedded into the top surface 30 of the card 14. This electronic display 32 may be an LCD display, or alternatively, it may be made of a light emitting polymer available from Cambridge Display Technology of Cambridge, U.K.

Card 14 is also provided with a zone 34 where information about a particular player, such as his date of birth, home town, and other statistics is printed in the usual manner. Text may also be printed on the bottom surface (not shown) of the card as well. Alternatively, zone 34 may comprise a second electronic display 34A (shown in FIG. 5) similar to display 32 but used for alphanumeric characters rather than images.

Adjacent to the zone 34 there is a switch 36, a battery 38 and a memory and driver circuit 40. These elements may be formed or mounted on the top surface 30, or alternatively, these elements may be embedded in card 14.

Disposed along one edge of the card 14, there is provided an interface 41 as shown in FIG. 4. Interface 41 is arranged to mate with a complementary interface 50 formed at the bottom of slot 24 as seen in FIGS. 2 and 3. The interface 41 may be, for example, a standard multi-pin connector and interface 50 may be a mating socket connector.

Referring now to FIG. 5, the battery 38, incorporated into card 14, provides power to the display 32 and the memory and driver circuit 40 so that when the switch is off, the display 32 is blank. Memory and driver circuit 40 includes data representative of at least one digital image. When the switch 36 is closed, the memory and driver circuit 40 is activated and provides signals to the display 32, thereby causing the display 32 to show an image corresponding to the stored data. As shown in FIGS. 1 and 2, this image may be a still picture of a baseball player.

The memory and driver circuit 40 may contain additional data and may be arranged so that with each subsequent activation of switch 36, different signals are sent to the display causing other images to appear on the display 32 as well. These other images may be other still pictures of the same player, or a different player. For example, if the memory and driver circuit 40 can hold sufficient data., then a single card 14 may be used to show pictures of all the players of a baseball team. In addition, the memory and driver circuit 40 may also store statistical data about one or several baseball players. This data may be shown by the display 34 or a separate display 34A disposed, for instance, on the back of card 14 or under display 32 thereby replacing zone 34. The image shown by display 32 and the text shown by display 34A (if used) can be changed by activating switch 36 again, or by activating a second switch provided for this purpose (not shown). In either case, the data for the images is retrieved from the memory and driver circuit 40.

In this manner, the card 14 can be used in a manner similar to a standard cardboard baseball card and a person may view the picture(s) shown by display 32 as well as the statistical and biographical data printed or displayed in zone 34. Of course, the electronic card 14 is capable of displaying much more information than a printed baseball card.

The stand 12 includes a frame 16 and a base 18. The frame 16 includes a back 20 and a border 22. At the top, a slot 24 is formed between the back 20 and the border 22, and is dimensioned to allow the card 14 to be inserted. The border 22 has a substantially rectangular cutout defining a window 26 through which at least a portion of the card 14 is visible when the card is disposed within the stand 12, as seen in FIG. 1.

The stand 12 acts as a card adapter to allow the user to download data from an external source and then selectively to store the data into the memory card. For this purpose, the stand 12 includes an electronic control circuit 62, a battery 44 which can be disposed, for instance, inside the base 18, as well as two switches 46 and 48. At the bottom of the slot 24, the stand 12 is provided with an interface 50 mating with the interface 41 on card 14 as discussed above. Mounted on base 18 there are also provided two speakers 54.

Referring again to FIG. 5, the stand 12 further includes switches 46 and 48, a microprocessor 56, a memory 58 and speakers 54, as well as a battery 60. When the card 14 is inserted into stand 12, these two components can have several modes of operation. In one mode of operation, the card 14 and stand 12 cooperate to show images of one or more players. Initially, as soon as the card 14 is inserted into the stand 12, the microprocessor 56, sensing the presence of the card 14 through interfaces 41, 50, generates a command to the memory and driver circuit 40. In response, the memory and driver circuit 40 generates signals for the display 32, which then shows the image of a player as shown in FIG. 1. The microprocessor 56 monitors the switch 46. If the switch 46 is closed, the microprocessor 56 generates a command for the memory and driver circuit 40 to advance to another image. Data for the images shown on display 32 can be stored in either memory and driver circuit 40 or memory 58. The presentation of the images on display 32 may be accompanied by sounds played by speakers 54 thereby generating a multi-media presentation. Since the sounds can be played only by speakers 54, the data for these sounds is preferably stored in memory 58.

Power for both the circuitry in the base 12 and the card 14 in this mode can be provided by battery 60, thereby extending the life of battery 38.

As previously mentioned, the base 18 is further provided with an external interface 52. This interface 52 is used to connect the stand 12 to an external information source such as a computer or an Internet gate to update the data stored in memory 58. After the new data is downloaded into the memory 58, switch 48 may be activated by a user, and in response, the new or updated information is uploaded from memory 58 to the memory and driver circuit 40. In this manner, the data stored by the card 14 can be kept current. Interface 52 may be a standard serial port, a parallel port, a USB device, an RS-232 port, etc.

Once new data has been sent to the memory and driver circuit 40, the card 14 can be removed from the stand 12 and viewed independently.

Figure 6:
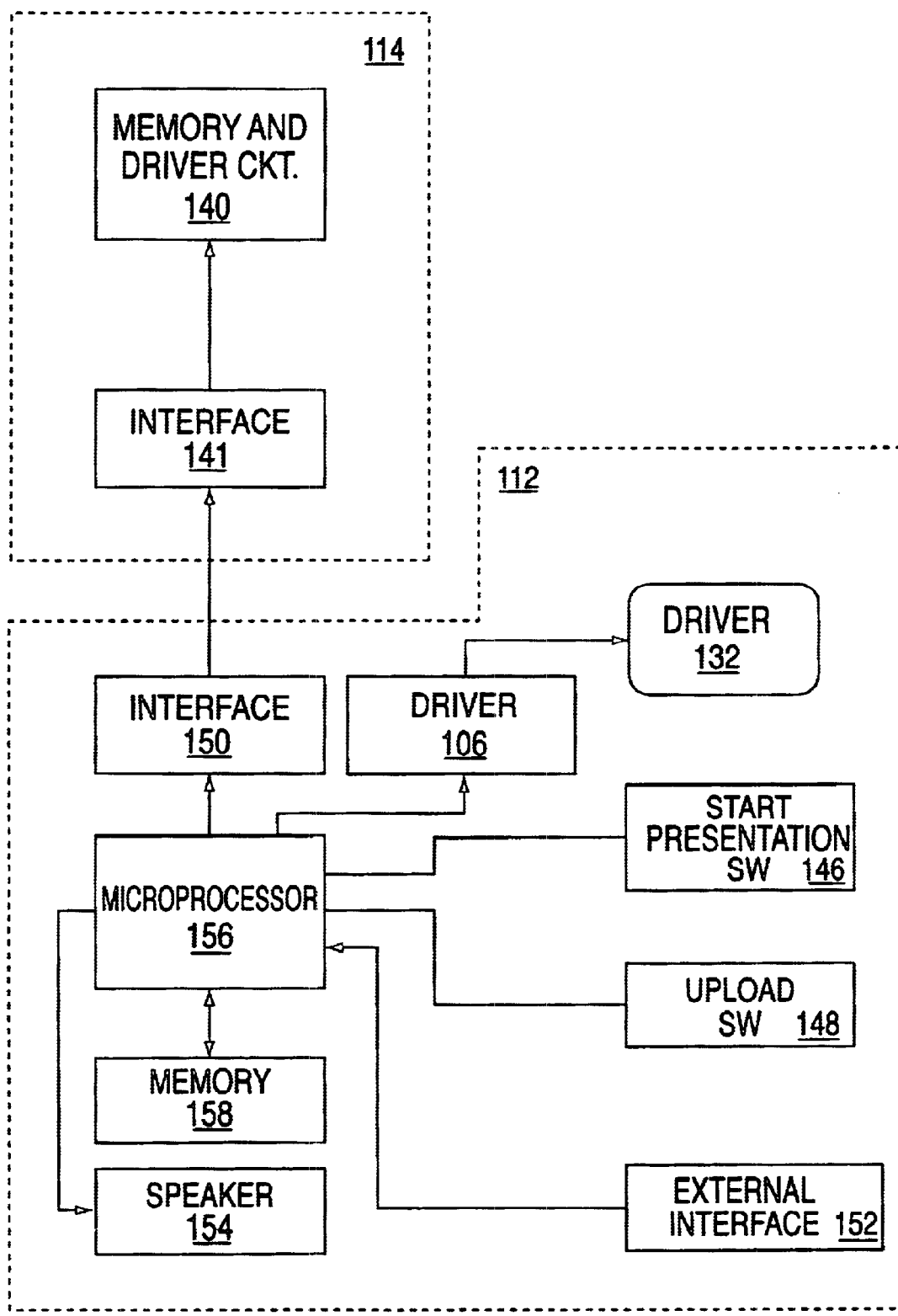
FIG. 6 shows a block diagram of an alternate embodiment of the baseball card assembly of FIGS. 1–3.

An alternate embodiment of the invention is shown in FIG. 6. Card 114 is similar to the card 14 in that it has a memory 140 and interface 141. But it does not have a display. Instead, a standard still image is printed in the area corresponding to display 34.

The stand 112 includes a microprocessor 156, an interface 150, a memory 158, speaker 154, a display 132, switches 146 and 148, external interface 152 and driver 166. The display 132 may be placed on any convenient visible surface of stand 112.

If the stand 112 has a similar configuration to the stand 12 of FIGS. 1–3, then its display 132 may be placed in the window 26, as indicated in FIG. 3, thereby blocking the picture on the card 114.

The memory 158 receives imaging data, as described more fully below. In response to commands from switch 146, activated by the user, the microprocessor 156 retrieves this data from the memory 158 and generates signals to driver 166 which in turn activates the display 132 to show a corresponding image.

In this embodiment, when the card 114 is not inserted into the stand 112, it can be used just like any normal printed card since it does not have a display on which data from memory 140 can be displayed. However, when it is inserted into the stand 112, its interface 141 is mated with the interface 150 allowing the data stored in memory 140 to be downloaded into memory 158. Once this information is downloaded, the user can see corresponding images on display 132. As in the previous embodiment, multi-media presentations formed of still or moving images on display 132 can be accompanied by sounds from speakers 154. Moreover, the images may also include statistical data.

The stand 112 need not be dedicated to a particular card 114 but can be used with any card. Thus, collectors can exchange cards and review images or statistical data on a generic stand 112.

The electronic cards 10, 114 are described in the preferred embodiment as baseball cards, i.e., cards displaying images of baseball players. Of course, these cards as well as the assembly may be used to show and store images related to any other sports personalities, as well as images of other sports and entertainment personalities. In fact, the cards could be used as a pocket picture album to display any images stored in the card's memory.

Obviously, numerous modifications may be made to the invention without departing from its scope as defined in the appended claims.

We claim:

1. An electronic card associated with a particular theme, including person, character or object comprising:

a flat body having a uniform thickness and being sized and shaped to conform to a standard sports card and including a memory storing imaging data corresponding an image of said theme; and an electronic display disposed on said body and associated with said memory, said display being adapted to receive said imaging data and display said image;

wherein said flat body further comprises a text zone formed on said flat body, said text zone comprising textual information;

wherein said textual information is printed on said flat body.

2. The electronic card of claim 1 further comprising a selector element adapted to control said display.

3. The electronic card of claim 1 wherein said text zone includes another display associated with said memory, and wherein said memory stores alphanumeric characters, said alphanumeric characters being displayed on said other display.

4. The electronic card of claim 1 wherein said memory stores imaging data corresponding to a plurality of images, and further comprising a selector for selecting one of said images for said display.

5. The display card of claim 1 further comprising a data port coupled to said memory, said data port being adapted to receive imaging data for storage by said memory.

6. An electronic card assembly comprising:

a theme specific electronic card for showing a specific image of said theme and having a flat body having a substantially uniform thickness and sized and shaped to conform to a standard sports card, a display disposed on said flat body, a memory adapted to store data of images to be shown on said display, said display being adapted to show said specific image of said specific theme from said memory and an input port for receiving data for said memory; and an adapter mounted on said flat body for coupling to said input port to transmit data to said memory.

7. The electronic card assembly of claim 6 wherein said adapter includes an interface for receiving external data and an adapter memory storing external data from said external interface.

8. The electronic card assembly of claim 7 wherein said adapter is adapted to selectively transmit said external data to said electronic card.

9. An electronic card assembly comprising:

an electronic card having a flat body, an input data port adapted to receive imaging data, a card memory receiving and storing said imaging data, and a display coupled to said memory to display images corresponding to said imaging data; and a stand adapted to receive said electronic card, said stand including an internal interface for interfacing with said input data port, a stand memory storing said imaging data, and a selector for effecting the transfer of said imaging data from said stand memory to said card memory.

10. The card assembly of claim 9 wherein said stand further includes an external interface that receives said imaging data from an external source for storage in said stand memory.

11. The card assembly of claim 9 further comprising speakers for generating audio sounds, said speakers cooperating with said card to generate a multi-media presentation.

12. The card assembly of claim 11 wherein said speakers are associated with said card memory to receive audio signals associated with said multi-media presentation.

13. The card assembly of claim 9 wherein said stand further comprises switches for controlling data transfer to said card.

14. The card assembly of claim 9 wherein said stand includes a frame arranged to receive said card with said display being visible through said frame.

* * * * *